Oct. 17, 1967 A. G. VALLES ETAL 3,347,770

AREA MEASUREMENT AND CURRENT DENSITY CONTROL DEVICE

Filed Sept. 3, 1964

INVENTORS
ANTHONY G. VALLES,
FRANCIS A. SCHREIHANS,
By John N. Hazelwood
ATTORNEY.

United States Patent Office 3,347,770

Patented Oct. 17, 1967

3,347,770

AREA MEASUREMENT AND CURRENT DENSITY CONTROL DEVICE

Anthony G. Valles and Francis A. Schreihans, Pomona, Calif., assignors to General Dynamics Corporation, Pomona, Calif., a corporation of Delaware Filed Sept. 3, 1964, Ser. No. 394,233
8 Claims. (Cl. 204—228)

ABSTRACT OF THE DISCLOSURE

Generally, this disclosure relates to a method and instrument utilizable in conjunction with an electroplating unit which is capable of determining the plating area of an unknown workpiece and which is adjustable so as to control the current density of the electroplating unit in accord with the determined area. More particularly, the instrument is based on an existing correlation between cathode polarization, solution resistance, total current and plating area and comprises three meters which are connected in a particular circuit configuration including a pair of auxiliary electrodes and a three-way switch, such circuit arrangement being adapted to measure the parameters necessary for the utilization of the aforesaid correlation so as to establish the most suitable current density relative to work pieces of any particular area.

Figure 1:
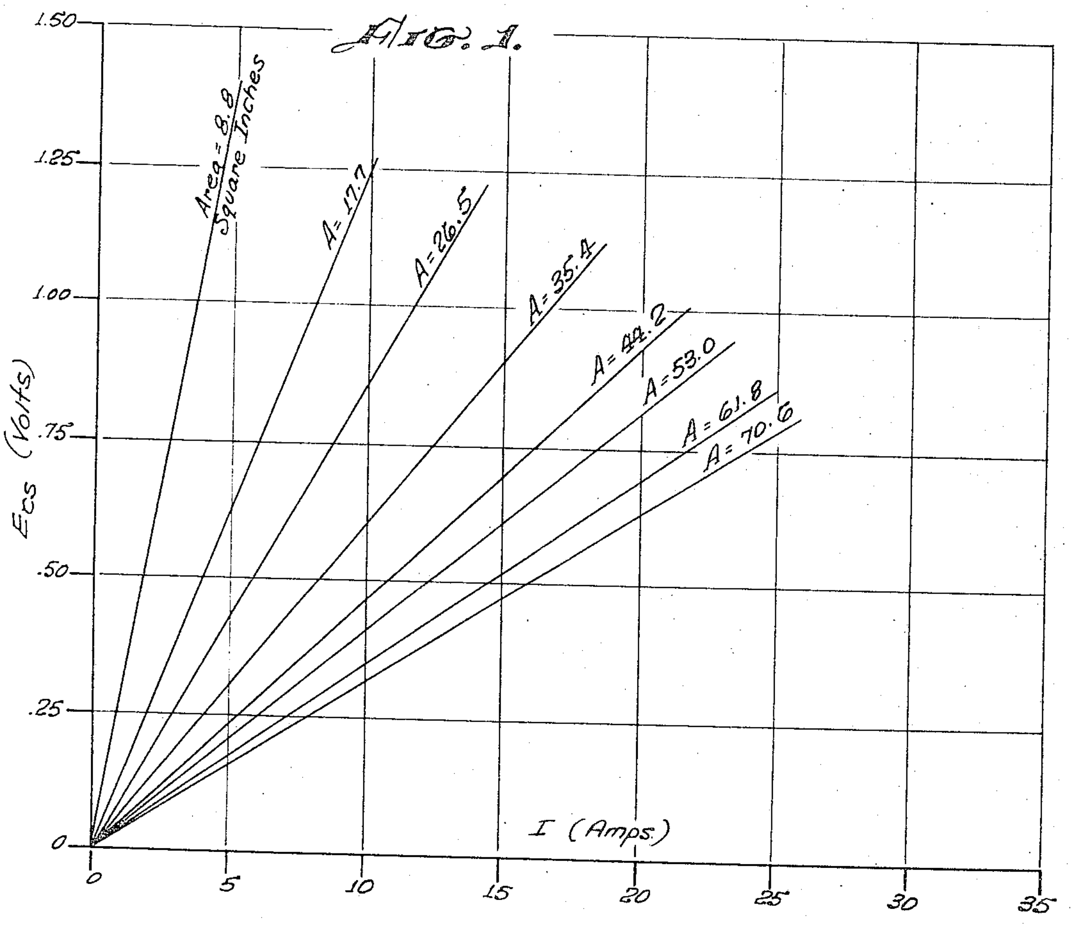

This invention relates to electroplating, and more particularly to a method and apparatus for the control of electroplating current density.

The accepted method of controlling plating thickness and quality is by controlling the current density of the parts being plated. However, in order to calculate the current density, the area of the part to be plated must be known. Calculating the area of various geometric shapes, like printed circuit boards, becomes quite difficult and time consuming.

The prior known methods employed for plating by current density control require measurements and calculations which are very often time consuming and may be beyond the abilities of plating operator. Several steps are required to obtain enough information for an operator to calculate the required current to obtain a specified current density at which to plate, these steps being:

(1) First an operator must determine the area of the parts to be plated. This may be very tedious and time consuming when considering such complex area configurations as printed circuit boards. The operator must measure numerical values and go through mathematical calculations to obtain the correct area.

(2) After determining the area of a load, an operator must then multiply the area by the desired current density to obtain the total current to be used on the plating load. An operator without mathematical dexterity will have difficulty performing these tasks.

(3) The operator must then manually adjust a power supply to obtain the desired current output to the load to be plated.

The present invention is designed in such a manner that no mathematical manipulations would be required of a plating tank operator. All the operator is required to do is read meters which depict the pertinent information he requires, such as total area and current density. The use of this invention will reduce time consumed in measuring areas and eliminate errors caused through use of mathematical calculations.

This invention relates to a method and apparatus for determining area and controlling current density in the electrodeposition of metallic coatings from electrolytes.

The invention is particularly suitable for those processes where plating thickness and physical attributes of the plated film are heavily dependent upon accurate control of current density. For example, in the circuit board industry it is often desirable to plate to a specified film thickness. If the current density is too low, the length of time required to do the job will be excessive. If the current density is too high, the plated film will have a rough appearance and be physically weak.

Therefore, it is an object of this invention to provide a method and apparatus for controlling electroplating current density.

Another object of the invention is to provide a method and apparatus for determining area and controlling current density in the electrodeposition of metallic coatings from electrolytes.

Another object of the invention is to provide a simple and economic method and apparatus for determining the area of parts to be electroplated and relating this area to current density by simple electrical circuitry.

Figure 2:
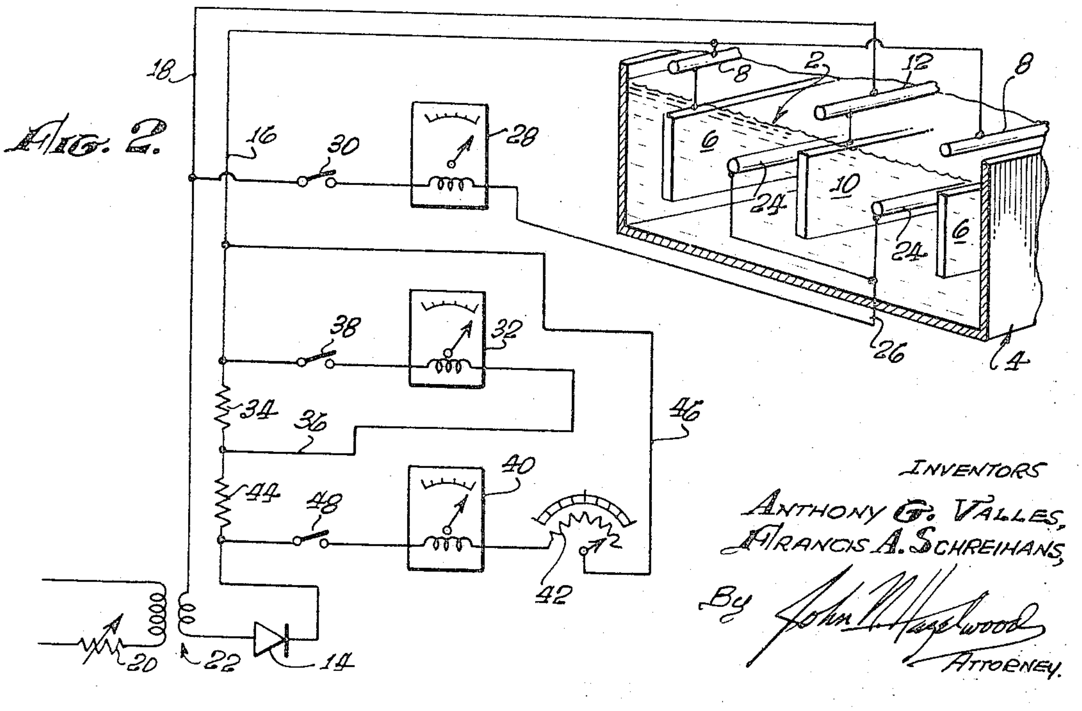

Other objects of the invention will become readily apparent from the following description and accompanying drawings wherein:

FIG. 1 is a graph which supports the theory upon which the invention is based; and FIG. 2 is a schematic view of a typical plating tank arrangement with the apparatus for carrying out the invention connected thereto.

A correlation was found to exist between cathode polarization, solution resistance, total current, and the area being plated. A typical set of curves is shown in FIG. 1 wherein $E_{cs}$ (solution potential plus cathode polarization) vs. I (total current) for different cathode areas is shown. It is evident from these curves that their slope $dE_{cs}/dI$ varies with the area and is shown wherein:

(1) $E_{cs}$ is the voltage between an intermediate electrode (not connected electrically to the circuit) and the work being plated;

(2) $E_{cs}$ is defined as the sum of the voltage drops due to cathode polarization and solution resistance; and (3) $dE_{cs}/dI$ is the change of $E_{cs}$ with respect to the plating current.

It is hypothesized that the lines in FIG. 1 exhibit progressively changing slopes because of two main phenomena occurring during the plating process. These are:

(1) The electrolytic current path between the anodes (which remain a relatively constant size) and the work to be plated varies with the area of the work so that the total resistance that the current experiences in the plating solution is a function of the plating area.

(2) The cathode polarization voltage is a function of current density.

In studying the curves illustrated in FIG. 1, it is observed that if the voltage $E_{cs}$ is maintained constant for given areas, there will be a corresponding value of total current for each area; or conversely if the $E_{cs}$ voltage is maintained constant and the total current is read, there is a corresponding area value for each current value.

Practical use is made of the above fact in the area determining portion of the instrument. The $E_{cs}$ is brought up to an arbitrary established value and the area is read directly off an ammeter. The ammeter is calibrated linearly in area, therefore, for any given area of a part to be determined, the ratio of total current to area is always the same. The contribution to the total value of $E_{cs}$ due to polarization is therefore the same, independent of area, because polarization is directly proportional to the ratio of current to area. Any change, therefore, of $E_{cs}$, at some constant current density, is due only to the geometry of the load and is independent of the average polarization value. The given geometry of the load can then be compensated for by calibrating the meter which detects $E_{cs}$.

The sensing elements in the plating tank which are used in measuring $E_{cs}$ consist of two wire electrodes which run in parallel with the load in the tank and are equally spaced from the center of the tank. The two electrodes are connected together at one end. The load may then be placed in any position between the two electrodes and the sum of the distances of the load from the electrodes always remains the same. This gives a constant potential reading of $E_{cs}$ at some current value which is independent of the location of the load in the tank.

In the current density meter portion of the device, use is made of an ammeter whose external shunt is replaced by a circuit having a resistance which can be varied so that different fractions of the total current will go through the meter coil. The variable resistance has a dial calibrated in area such that the meter can be used for establishing current density of any area within the designed limits of the meter. As an example, if the resistance of the variable resistor is set at zero (calibrated 20 sq. in.), a total plating current of 20 amperes will give full scale deflection of the meter. This is equivalent to one ampere per square inch. The current density meter, for example, is calibrated between zero and one amp/sq. in., the normal range of plating current densities. Increasing the variable resistance (equivalent to increasing the area) will require more total current to give full scale deflection of the meter.

Referring now to FIGURE 2 which illustrates an embodiment for carrying out the invention, numeral 2 indicates an electrolyte in a plating tank 4. Anodes 6 located within tank 4 and beneath electrolyte 2 are supplied plating current through anode bus bars 8. A plating load or cathode 10 also positioned in tank 4 beneath electrolyte 2 is connected to cathode bus bar 12. Plating current is supplied to the tank 4 by a rectifier 14 through wire 16 connected to the bus bars 8. The return current path is completed through the electrolyte 2 to the cathode 10, through the bus 12 to wire 18, and back to the rectifier 14. The rectifier current is controlled by a powerstat 20 and stepdown transformer 22. Wire sensing electrodes 24 are placed below the electrolyte surface and connected by wire 26 to a voltmeter 28, through a switch 30 to the cathode 10 also positioned in tank 4 beneath electrolyte the potential between the sensing electrodes 24 and the work load 10. This potential varies non-linearly with the size of each piece of plating load 10 as determined at some specified current density. This potential variation is then a reflection of the geometric size of the load being plated.

An ammeter 32 is connected across a high current shunt 34 by means of a wire 36 and through a switch 38. The scale of ammeter 32 is calibrated linearly in area and the ratio of plating current to area calibrated mathematically reflects a value of constant current density. Meter 32 is calibrated such that the actual ratio of current through a shunt 34 to the area calibrated on the scale (current density) is equal to 0.2 amps/sq. in.

The deflection of voltmeter 28 corresponds to voltage values, however the meter is calibrated in area so comparison can be made directly with readings on meter 32, which are also in area. Ammeter 32 in conjunction with voltmeter 28 forms the area determining portion of the instrument. The scale of voltmeter 28 is calibrated in area using plating loads of known areas and increasingly larger geometric sizes as ammeter 32 reads the appropriate area value for the individual piece of plating load. Ammeter 32 is made to deflect to the desired area value by increasing plating current from the rectifier 14 by means of powerstat 20.

Another ammeter 40 is connected in series with a variable resistor 42. This meter is connected across shunts 34 and 44 by a wire 46 and through switch 48. The variable resistor 42 has a scale calibrated in area. An increasing resistance of resistor 42 is made to reflect an increase of area on the scale. The circuit connected by wire 46 reflects the plating current to the tank 4 and combined with resistor 42, meter 40 reflects the ratio of current to area, or current density for a specific area setting of resistor 42. The scale of meter 40 is calibrated directly in current density units.

The actual operation of the area determining and current density controlling instrument of the invention is as follows: Assume a given work load to be plated consisting of 8 pieces of metal strip of the same dimensions but with unknown areas and that it is desired to plate the strips at a current density of 0.3 ampere per square inch. One of the eight pieces is placed in tank 4 in the position of work load 10 and connected to bus bar 12. The metal strips are to be copper plated, the electrolyte 2 consisting of copper fluoroborate. The switches 30 and 38 are closed and the rectifier current gradually turned up by means of powerstat 20. Meters 28 and 32 begin to deflect, and the powerstat 20 is turned up until the area values on the scales of meters 28 and 32 are the same. The deflection of both meters are not identical and there exists one unique point at which both meters will have the same area value. For the given load under consideration, 8.8 square inches is read off both meter 28 and meter 32 for this one strip. This 8.8 square inches is selected as the reference point on meter 28 and now any number of pieces of work load having the same geometric configuration can be loaded into tank 4 and connected to bus bar 12. Meter 28 now acts similar to a constant voltage control once the area of a piece with a given geometry has been determined with the aid of meter 32. The eight strips to be plated are connected to bus bar 12. Powerstat 20 is now turned up until the reference point of 8.8 is read on meter 28. The actual current needed to obtain the given voltage drop across meter 28 is now 8 times greater than with the one piece in the tank 4. This is reflected in meter 32 which is calibrated linearly in area and is directly proportional to the current flowing through shunt 34. Meter 32 now reads 70.6 square inches which is the total area of the load 10 in tank 4. The pointer on the dial of the variable resistor 42 is now turned to 70.6 square inches. Switches 30 and 38 are opened and switch 48 is closed. Meter 40 now deflects proportional to the current flowing through shunts 34 and 44, the amount of deflection being proportional to the setting of resistor 42. In this case the powerstat 20 is turned up until meter 40 reads 0.3 ampere per square inch, the specific current density required for the job. If an ammeter on the rectifier 14 were read directly, it would indicate 21 amperes flowing to the load 10.

When circuit boards consisting of large geometric size relative to the many small segments of conductive area scattered on the face of the board, the deflection of meter 28 approaches a limiting value for these many small areas at a specified current density. The fact is incorporated in meter 28 by drawing a line on the scale of the meter corresponding to this limiting value. For circuit boards, powerstat 20 is turned up until the pointer on meter 28 reads this reference value and the total area of conductive surface is read directly off meter 32. This eliminates the one step of comparison of meters 28 and 32 to establish a reference point on meter 28.

Physical constants for elements of the instrument may be exemplified as follows:

Meter 28—1 milliamp scale, calibrated nonlinearly in sq. in., resistance 2100 ohms
Meter 32—1 milliamp scale, calibrated 0 to 250 sq. in.; resistance 50 ohms
Meter 40—50 micramp scale, calibrated 0 to 1.0 amps/sq. in., resistance 620 ohms
Shunt 34—rated at 50 mv. at 100 amps
Shunt 44—rated at 100 mv. at 100 amps
Resistor 42—0 to 10,000 ohms, ½ watt, scale calibrated 20 to 320 amps/sq. in.
Resistor 14—rated at 100 amperes, 15 volts.

It has thus been shown that the invention provides a method and instrumentation which will determine the actual conductive area on parts to be electroplated with conventional electroplating techniques by electrical means, using shunts, meters and resistors in the circuit along with appropriate wire electrodes for measuring solution and polarization resistances or voltage drops, and all elements being connected by suitable electrical wiring. Also, the device of the invention will determine the actual current density at which a part is being electroplated with conventional electroplating techniques by electrical means, using shunts, meters and resistors in the circuit along with appropriate electrical wiring.

Although a particular embodiment of the invention has been illustrated and described, modifications will be apparent to those skilled in the art, and it is intended to cover in the appended claims all such modifications as come within the scope and spirit of the invention.

What we claim is:

1. The method of determining area and controlling current density in the electrodeposition of metallic coatings from electrolytes comprising the steps of containing a quantity of electrolyte, placing material to be plated in the electrolyte, operatively connecting the material to be plated to an electric circuit, supplying current to the electrolyte through anode means located on opposite sides of the material to be plated, positioning sensing means on opposite sides of the material to be plated, determining the potential between the sensing means and the material to be plated for determining the area of the material to be plated due to this potential varying non-linearly with the area of the material to be plated, determining the current supplied to the electrolyte, controlling the current supplied to the electrolyte, and controlling the power supplied to the electric circuit.

2. A device for determining area and controlling density in the electrodeposition of metallic coatings from electrolytes comprising: a container adapted for containing an electrolyte, means for supporting associated material to be plated, which functions as cathode means when immersed in electrolyte contained in said container, means for supplying electric current through the associated electrolyte, sensing means positioned on opposite sides of the cathode means, means for determining the potential between the cathode means and said sensing means for determining the area of associated material to be plated, the potential between the cathode means and said sensing means varying non-linearly with the area of the associated material to be plated, means for determining the current supplied to the associated electrolyte, means for controlling the current supplied to the associated electrolyte, and means for controlling the power supplied to the current controlling means.

3. The device defined in claim 2, wherein said sensing means includes an electrode positioned on each side of the cathode means, and wherein said potential determining means includes a voltmeter and switch means, said voltmeter being connected to each of said electrodes, and said switch means being connected to said voltmeter and to the cathode means through a bus bar means.

4. The device defined in claim 2, wherein said means for supplying electric current through the associated electrolyte includes an anode positioned on each side of the cathode means, a bus bar means connected to each of said anodes, rectifier means operatively connected to said bus bar means, and transformer means operatively connected to said rectifier means.

5. The device defined in claim 2, wherein said current determining means includes shunt means, an ammeter connected across said shunt means, and switch means operatively connected to said ammeter, said shunt means being operatively connected to said means for supplying electric current through said electrolyte.

6. The device defined in claim 2, wherein said means for controlling the current supplied to the associated electrolyte includes shunt means, an ammeter connected in series with a variable resistor means and connected across said shunt means through switch means, said shunt means being operatively connected to said means for supplying electric current through the associated electrolyte.

7. The device defined in claim 2, wherein said power controlling means includes a powerstat means adapted to be connected to a source of electrical energy and to said means for supplying electric current through the associated electrolyte.

8. A device for determining area and controlling density in the electrodeposition of metallic coatings from electrolytes comprising: a container for an electrolyte; material of unknown area to be plated which functions as a cathode when immersed in electrolyte contained in said container; an anode positioned within said container on each side of said material; an electric circuit operatively connected to said material and said anodes and including a transformer means adapted to be connected to a source of electric power, said transformer means being connected to said material through bus bar means, and rectifier means connected to said transformer means and to said anodes through bus bar means; a pair of sensing electrodes positioned between said material and said anodes, each of said electrodes being operatively connected to said material through voltmeter means and switch means; a pair of shunt means positioned between said rectifier means and said anodes; an ammeter means and a second switch connected across one of said pair of shunt means; a second ammeter means connected in series with a third switch means and a variable resistor means and connected across said pair of shunt means; and means for controlling the power supplied to said transformer means.

References Cited

UNITED STATES PATENTS

| | | | |
|---|---|---|---|
| 2,584,816 | 2/1952 | Sands | 204—231 |
| 2,603,595 | 7/1952 | Rendel | 204—211 X |
| 2,820,004 | 1/1958 | Rendel | 204—211 |
| 3,166,484 | 1/1965 | Hentz | 204—231 X |

FOREIGN PATENTS

| | | |
|---|---|---|
| 875,595 | 8/1961 | Great Britain. |
| 941,362 | 11/1963 | Great Britain. |
| 947,464 | 1/1964 | Great Britain. |

ROBERT K. MIHALEK, *Primary Examiner.*

JOHN H. MACK, *Examiner.*

D. R. VALENTINE, *Assistant Examiner.*